Oct. 19, 1954 — E. J. NYGREN — 2,692,021
MACHINE FOR CUTTING TUBING
Filed June 4, 1952 — 2 Sheets-Sheet 1

INVENTOR
ERNEST J. NYGREN

BY *Young Wright*
ATTORNEYS

Oct. 19, 1954 E. J. NYGREN 2,692,021
MACHINE FOR CUTTING TUBING
Filed June 4, 1952 2 Sheets-Sheet 2
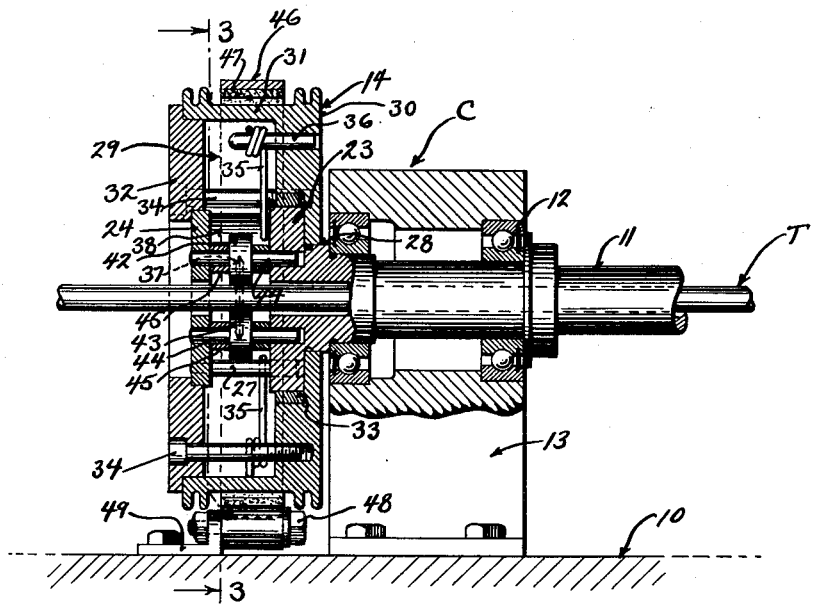
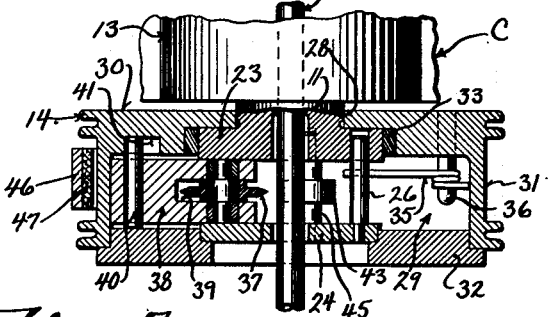
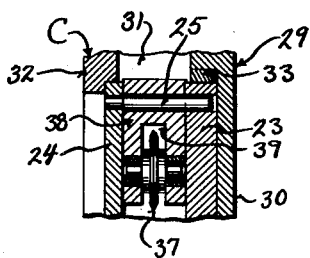
INVENTOR
ERNEST J. NYGREN
BY
ATTORNEYS Patented Oct. 19, 1954

2,692,021

UNITED STATES PATENT OFFICE 2,692,021

MACHINE FOR CUTTING TUBING

Ernest J. Nygren, Milwaukee, Wis., assignor to Ben-Hur Mfg. Company, Milwaukee, Wis.

Application June 4, 1952, Serial No. 291,664

6 Claims. (Cl. 164—60)

This invention appertains to the cutting of predetermined lengths of material off of stock and more particularly to the cutting of metal or other tubing.

In the cutting of the tubing, particularly tubing of such a soft nature that it is impractical to rotate the tubing, such as is done in some pipe machines, due to the tendency of the tubing to bend and whip in rotation, many problems are encountered; such as the mashing or flattening of the tube at the point of cut or the forming of burrs on the cut edges. Where shear blades are used, the mashing or flattening of the tube takes place and where saws and certain cutters are used, burrs or rough edges are formed. This necessitates additional steps in the treating of the cut lengths before the same can be used.

It is therefore, one of the primary objects of this invention to provide a novel machine, which will quickly and uniformly sever tubing into desired lengths without mutilating the tubing in any way, thereby effectively eliminating the necessity of employing additional steps in the treating of the cut lengths; the machine making it possible to take tubing off of a coil or reel, run the same through a short straightener and then cut off, which is not possible on any of the present methods of rotating the tubing in a cut off machine.

Another salient object of the invention is the provision of a machine embodying a rotatable head through which the tubing is axially fed, with novel means under the control of the operator for automatically bringing into play a cutter disc for quickly and cleanly cutting the tube.

A further object of the invention is the provision of novel means carried by the rotatable head for effectively supporting the tube adjacent to the point of cut during the bringing of the disc cutter automatically into cutting position.

A further important object of the invention is the provision of a rotary head carrying therewith for limited movement thereon, a brake drum with means under the control of the operator for momentarily slowing up the rotation of the drum by means of a brake band so that such momentary slowing up of the brake drum will affect a desired movement of the disc cutter into an operative cutting position for cleanly severing a desired length off of the tube.

A still further object of the invention is the provision of resilient means for normally holding the brake drum in a predetermined position on the head for rotation therewith with the disc cutter in an inactive non-cutting position.

A further important object of the invention is the provision of novel means for constructing the rotating head and the drum so that all operative parts will be effectively housed within the head and the drum.

A still further object of the invention is to provide an improved tube cutter of the above character, which will be durable and efficient in use, one that will be simple and easy to manufacture and one which can be operated with a minimum amount of effort.

With these and other objects in view, the invention consists in the novel construction, arrangement and formation of parts, as will be hereinafter more specifically described and claimed, and illustrated in the accompanying drawings, in which drawings, Figure 1, is an end elevational view of the improved cutter, showing the same mounted on a base or table, the table being shown in transverse section.

Figure 5, is a longitudinal sectional view through the tube cutter taken on the line 5—5 of Figure 3, looking in the direction of the arrows and showing the novel support for the tube in the head.

Figure 6 is a section view through the cutter head taken on the line 6—6 of Figure 3 looking in the direction of the arrows.

Figure 7 is a detail sectional view taken on the line 7—7 of Figure 3, looking in the direction of the arrows and illustrating the mounting of the cutter disc.

Referring to the drawings in detail, wherein similar reference characters designate corresponding parts throughout the several views, the letter C generally indicates the novel cutting machine and T the tubing to be cut into length.

Figure 1:
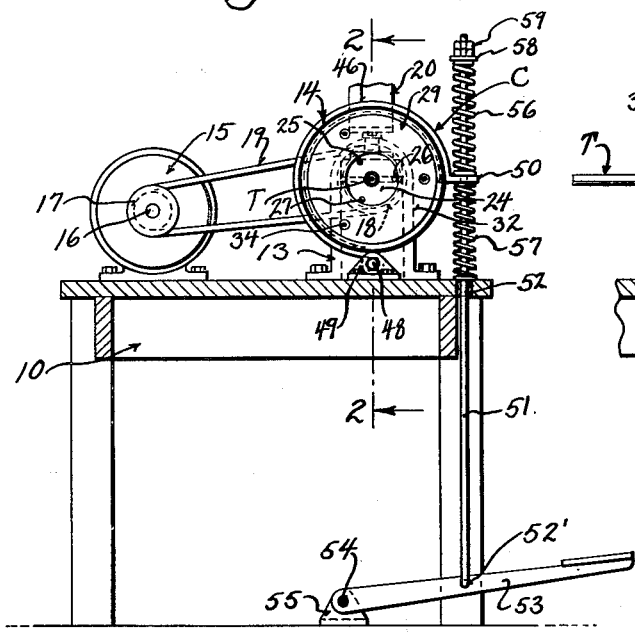
Figure 2:
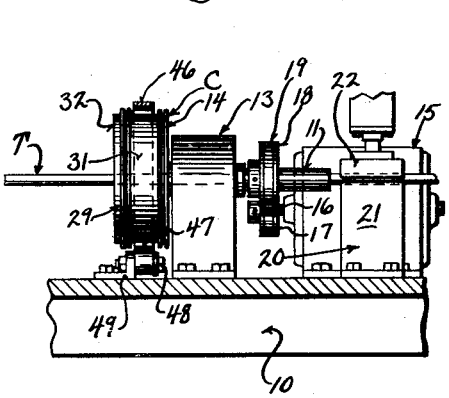
Figure 2, is a longitudinal sectional view through the base or table taken on the line 2—2 of Figure 1, showing the cutter partly in elevation.

The cutting machine C can be mounted on any desired type of support such as a table 10 and the machine includes a longitudinally extending hollow shaft 11 through which the tubing T is fed. The shaft is mounted for free rotation in suitable bearings 12 carried by a bearing bracket or pedestal 13, which is firmly mounted on the table 10. The shaft 11 carries for rotation therewith the head 14, which will be later described in detail. It is to be noted, however, that the head 14 is of a circular shape in end elevation and that the tube T is fed through the shaft 11 and axially through the head 14. The shaft 11 can be driven in any desired way and as illustrated, an electric motor 15 of the desired horsepower is secured to the table 10 and the armature shaft 16 thereof has connected therewith a pulley wheel 17. The hollow shaft 11 has also secured thereto a pulley wheel 18 and a pulley belt 19 is trained about the pulley wheels 17 and 18. Means 20 is also mounted on the table 10 at one side of the bearing pedestal 13 for momentarily gripping or clamping the tubing T at the time of the severing of a piece from the tubing. The clamping means 20 can be of any desired type and can consist of a stationary jaw 21 and a movable jaw 22. The movable jaw can be operated hydraulically if desired.

Now referring more particularly to the head 14, the same includes inner and outer spaced parallel plates 23 and 24 and these plates are securely held together by pins 25, 26 and 27. The inner plate 23 is formed on or secured to the forward end of the shaft 11 and the shaft adjacent to the plate 23 has also formed thereon an annular bearing surface 28, the purpose of which will now appear.

Mounted on the plates 23 and 24 for limited turning movement is the brake drum or shell 29, and this drum or shell 29 includes the disc shaped inner wall 30, the annular brake drum rim 31 and a cover plate 32 mounted in spaced relation to the wall 30. The wall 30 is mounted on the periphery of the inner plate 23 and on the annular bearing portion 28 of the shaft 11. A bearing ring 33 can be placed between the periphery of the inner plate 23 and the wall 30. The cover plate 32 is mounted on the outer plate 24, as is best shown in Figures 5 and 6. The cover plate 32 is rigidly connected to the inner wall 30 by the use of stud bolts 34 and the like. The mounting of the shell or brake drum 29 is such that the same can turn on the inner and outer plates 23 and 24. To normally bring about the rotation of the shell or drum with the plates 23 and 24 and the shaft 11, springs 35 are carried by pins 36 secured to the wall 30 and the opposite ends of these springs bear respectively against the pins 26 and 27 carried by the plates 23 and 24 and a member carried by the pin 25, as will be later set forth, and the inner surface of the brake drum rim 31. For simplicity, the unit is shown with a brake drum and a brake band, however, it should be understod that any other construction using other means to affect angle displacement between the wall 30 and the plates 23 and 24, can be used, such as an electromagnetic means or disc brake or fluid coupling.

Figure 3:
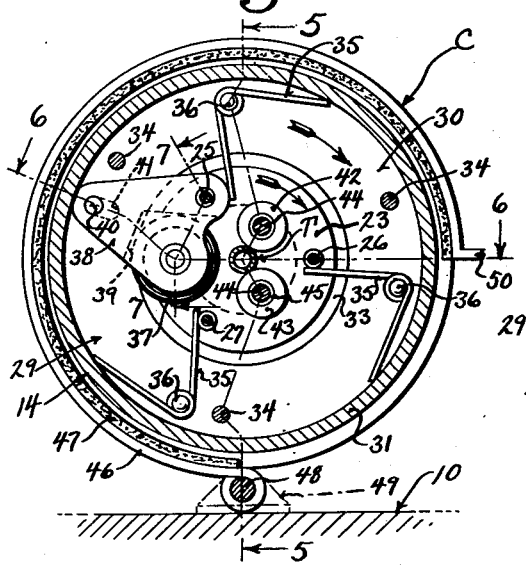
Figure 3, is an enlarged sectional view through the cutter head taken on the line 3—3 of Figure 5, looking in the direction of the arrows.
Figure 4:
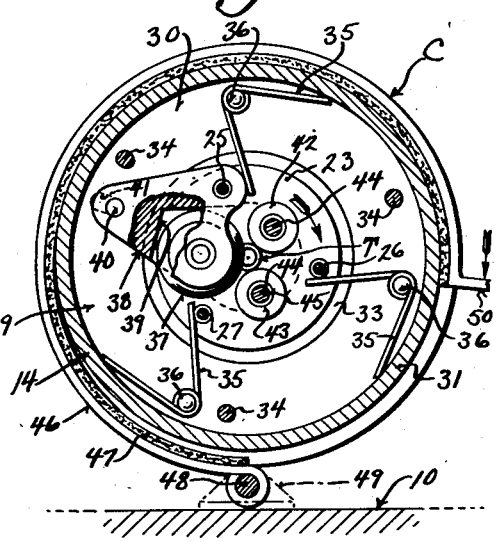
Figure 4, is a view similar to Figure 3 and showing the disc cutter in its operative position for cutting.

Mounted within the shell or brake drum 29 is the tube or pipe cutting disc 37. This disc is rotatably mounted on a triangular shaped carrier block 38. The carrier block 38 is bifurcated and the disc 37 is received in the bifurcation 39, as is best shown in Figures 4, 6 and 7. This disc protrudes beyond one corner of the block. The block itself is rockably mounted on the pin 25 heretofore mentioned, carried by the inner and outer plates 23 and 24. The extreme outer end of the carrier block 38 carries a pin 40 and this pin is slidably mounted in a short radially extending groove 41 formed in the inner surface of the wall 30. By referring to Figure 3, it can be seen that the carrier block 38 is mounted at one side of the tube T. The inner and outer plates 23 and 24 also rotatably carry guide and supporting rollers 42 and 43 and these rollers lie on the opposite side of the tube from the cutter disc 37. The tube T as the same is fed through the head 14 rests against the peripheries of the rollers 42 and 43 and slightly between these rollers. The rollers are mounted on shafts 44 carried by the plates 23 and 24 and suitable spacing collars 45 can be mounted on the shafts 44 so as to center the rollers between the plates 23 and 24. Rollers 42 and 43 can be adjusted by any of several different means (not shown) to take care of different sizes of tubing.

Referring back to the springs 35, it is to be noted that one of these springs bears against the carrier block 38 adjacent to its pivot point.

Partially encircling the brake rim 31 of the brake drum 29 is a brake band 46 and this brake band carries a brake lining 47. The inner end of the brake band is anchored to a stud 48 fixed to the table 10 by an anchor bracket 49 and the outer end of the brake band has formed thereon an outwardly extending apertured ear 50. Slidably extending through the ear 50 is an operating rod 51. The rod also extends through an opening 52 formed in the table. The lower end of the operating rod 51 is pivotally secured as at 52′ to an actuating pedal lever 53. The pedal lever 53 is rockably mounted as at 54 on a bracket 55 secured to the floor below the table. Coiled about the operating rod 51 on opposite sides of the ear 50, are expansion springs 56 and 57 and the inner ends of these springs bear against the ear. The upper end of the spring 56 bears against the washer 58 held in place on the rod by nuts 59. The lower end of the spring 57 bears against the table. It can be seen that by depressing the pedal lever 53, that the ear 50 of the brake band will be brought down, bringing the brake lining 47 into frictional contact with the periphery of the brake drum rim 31. Upon release of the foot pedal lever 53, the spring 57 will function to raise the rod 51 and the ear 50. The method of operating the brake, as shown, is for simplification, and the brake can be operated electrically or by air or hydraulics.

In operation of the improved machine, the copper tubing is fed between the jaws 21 and 22 of the clamp 20 through the hollow shaft 11 and the head 14. A stop, not shown, can be placed in advance of the machine against which the free end of the tube can abut to accurately fix the tube to permit a correct, desired length to be cut off of the same. While motor 15 is running, tube T can be fed forward to the desired length, and then the pedal lever 53 is depressed, the clamp is actuated by a means connected to the pedal lever to grip tube T to hold same against turning movement. Prior to the depression of the pedal lever 53, the entire head including the plates 23 and 24 and the shell or brake drum 29 is rotating as a unit with the rollers 42 and 43 rolling around the tube. Upon the depression of the foot pedal lever 53, the brake band 46 is brought into frictional contact with the brake rim 31 creating a drag thereon, which momentarily slows up the rotation of the brake drum against tension of the springs 35, causing angle displacement between plates 23, 24 and wall 30 and this angle displacement of wall 30 will hold the pin 40 and move the carrier block 38 inwardly toward the axis of the head 14, rocking the carrier block on its supporting pin 25. This movement, see Figure 4, brings the cutter disc 37 into cutting engagement with the tube T between the rollers 42 and 43 and the rotation of the head will carry the cutter disc around the tube and effectively and cleanly sever the tube. When the pin 40 reaches the end of the slot 41, the friction of the brake band is overcome and the brake drum and the plates 23 and 24 will rotate at the same rate of speed. After the cutting of this length, the pedal lever 53 and the clamp can be released and the spring 35 for the block 38 will move the cutter 37 and the block back to their normal positions and the tube can again be moved forwardly against the stop, at which time the clamp and pedal can again be actuated.

While I have shown only one cutter disc and one carrier block, it is to be understood that a plurality of carrier blocks and cutter discs can be used. This might be of advantage in cutting heavier pipe.

Changes in details may be made without departing from the spirit or the scope of this invention, but what is claimed as new is:

1. In a machine for cutting tubing and the like into desired lengths, a rotatable hollow shaft for receiving the tubing, means for rotating the shaft, a head rotatable with the shaft receiving the forward end of the tubing from the shaft, said head including a body portion and a brake drum movable on the body portion, means for normally urging the brake drum to rotate with the body portion at the same rotational speed an operator actuated brake band for engaging the drum to slow up the speed thereof relative to the body portion, a carrier block pivoted to the body portion for swinging movement, a rotatable cutter disc on said block movable upon swinging movement of the block toward and away from the tubing, and an operable connection between the brake drum and carrier block for swinging the carrier block on its pivot upon the slowing up of the brake drum including a pin and slot.

2. In a machine for cutting tubing and the like into desired lengths, a rotatable hollow shaft for receiving the tubing, means for rotating the shaft, a head rotatable with the shaft receiving the forward end of the tubing from the shaft, said head including a body portion fixed to the shaft and a brake drum movable circumferentially on the body portion, resilient means resisting movement of the brake drum on the body portion, a carrier block pivoted to the body portion, a rotatable cutter disc supported by the block movable with the block toward and away from the tubing upon the swinging of the block, means including a brake band for slowing up the rotation of the brake drum against the tension of said resilient means, and an operable connection between the brake drum and block for swinging said block on the body portion including a pin and a radial slot receiving the pin.

3. In a machine for cutting tubing and the like into desired lengths, a rotatable hollow shaft for receiving the tubing, means for rotating the shaft, a head rotatable with the shaft receiving the forward end of the tubing from the shaft, said head including a body portion fixed to the shaft and a brake drum movable circumferentially on the body portion including a side wall, a rim and a cover plate arranged in spaced relation to the side wall, said brake drum housing the head, spaced guide and rest rollers engaging the tubing at spaced points carried by the body portion, a triangular shaped carrier block pivoted at one corner to the body portion for swinging movement, a rotatable cutter disc carried by another corner of the block for movement with the block toward and away from the tubing between the rollers, a pin carried by the outer end of the block, and said wall of the brake drum having a radial slot for receiving the pin, means for normally urging the brake drum to rotate with the body portion at the same rotational speed, and means engaging the rim for slowing up rotation of the drum.

4. In a machine for cutting tubing and the like into desired lengths, a rotatable hollow shaft for receiving the tubing, means for rotating the shaft, a head rotatable with the shaft receiving the forward end of the tubing from the shaft including a body portion having inner and outer spaced plates with the inner plate fixed to the shaft, pins connecting the inner and outer plates together, and a brake drum having an inner side wall rotatable on the inner plate, a rim on said side wall and a cover plate arranged in spaced relation to the side wall engaging one edge of the rim and the cover plate, means rigidly connecting the cover plate to the side wall and against the outer plate of the body portion, spaced guide and rest rollers mounted between the inner and outer plates engaging the tubing at spaced points, a triangular shaped carrier block pivoted at one corner between the inner and outer plates, a cutter disc carried by another corner of said carrier block and movable with the carrier block toward and away from the tubing, the outer end of the block having an actuating pin and the side wall of said drum having a radial slot receiving the pin, a connection between the drum and body portion for resisting turning movement of the drum on the body portion, and means engaging the rim under the control of an operator for resisting turning movement of the rim under influence of the connection.

5. A machine for cutting tubing and the like into desired lengths comprising a rotatable hollow shaft for receiving the tubing, means for rotating the shaft, a head including a body portion rotatable with the shaft receiving the forward end of the tubing from the shaft, a guide and rest for the tubing rotatable with the body portion around the tubing, a carrier block pivoted to the body portion, a rotatable cutter disc supported by the block movable with the block toward and away from the tubing and the guide and rest for the tubing, and means actuated by a part of the head for swinging the block on its pivot, said actuating means including a brake drum, means for normally urging the brake drum to rotate with the body portion at the same rotational speed, means for creating a drag on the brake drum and for momentarily slowing up the speed of the brake drum relative to the body portion, and a pin and slot connection between the drum and block.

6. In a machine for cutting tubing and the like into desired lengths, a rotatable hollow shaft for receiving the tubing, means for rotating the shaft, a head rotatable with the shaft receiving the forward end of the tubing from the shaft, said head including a body portion fixed to the shaft and a brake drum movable circumferentially on the body portion including a side wall, a rim and a cover plate arranged in spaced relation to the side wall, said brake drum housing the head, spaced guide and rest rollers engaging the tubing at spaced points carried by the body portion, a triangular shaped carrier block pivoted at one corner to the body portion for swinging movement, a rotatable cutter disc carried by another corner of the block for movement with the block toward and away from the tubing between the rollers, a pin carried by the outer end of the block, and said wall of the brake drum having a radial slot for receiving the pin, and means engaging the rim for slowing up rotation of the drum, and resilient means housed within the drum normally resisting turning movement of the drum on the body portion.

References Cited in the file of this patent

UNITED STATES PATENTS

| Number | Name | Date |
|---|---|---|
| 205,527 | Cohen | July 2, 1878 |
| 986,937 | Mudd | Mar. 14, 1911 |